ND# United States Patent

Weaver et al.

[15] 3,659,111
[45] Apr. 25, 1972

[54] TWIN BEAM RADIATION ANALYSER USING RADIATION CHOPPERS

[72] Inventors: David R. Weaver, Carshalton; Anthony G. Emery, Bromley; Michael Henry Spearing, Epson, all of England

[73] Assignee: BP Chemicals Limited, London, England

[22] Filed: Apr. 9, 1070

[21] Appl. No.: 27,030

[30] Foreign Application Priority Data

Apr. 11, 1969 Great Britain..................18,630/69

[52] U.S. Cl. ........................250/220 R, 250/218, 250/225, 250/229, 356/205
[51] Int. Cl. .................................H01j 39/12, G01n 21/26
[58] Field of Search....................250/218, 225, 220 R, 229; 350/150, 151; 356/201, 204, 205, 207, 208, 173, 179

[56] References Cited

UNITED STATES PATENTS

| 2,688,090 | 8/1954 | Woodhull et al. | 250/229 X |
| 2,974,568 | 3/1961 | Dillon, Jr. | 250/229 X |
| 3,527,538 | 9/1970 | Allen et al. | 356/205 X |
| 3,512,001 | 5/1970 | Sproul | 250/218 |
| 3,487,225 | 12/1969 | Button | 250/218 X |
| 3,292,484 | 12/1966 | Clay | 356/205 |

Primary Examiner—Walter Stolwein
Attorney—Ward, McElhannon, Brooks & Fitzpatrick

[57] ABSTRACT

Method of analysis using a twin beam radiation analyzer in which the incident beams of radiation are modulated by a chopper activated by two, out of phase square wave form alternating currents to give two, out of phase, incident beams of radiation which are passed through two sample cells, collected in a single detector, the resulting signal being resolved to give the fundamental alternating current wave form, the phase shift of which is related to the difference in absorption of the contents of the two sample cells.

10 Claims, 8 Drawing Figures

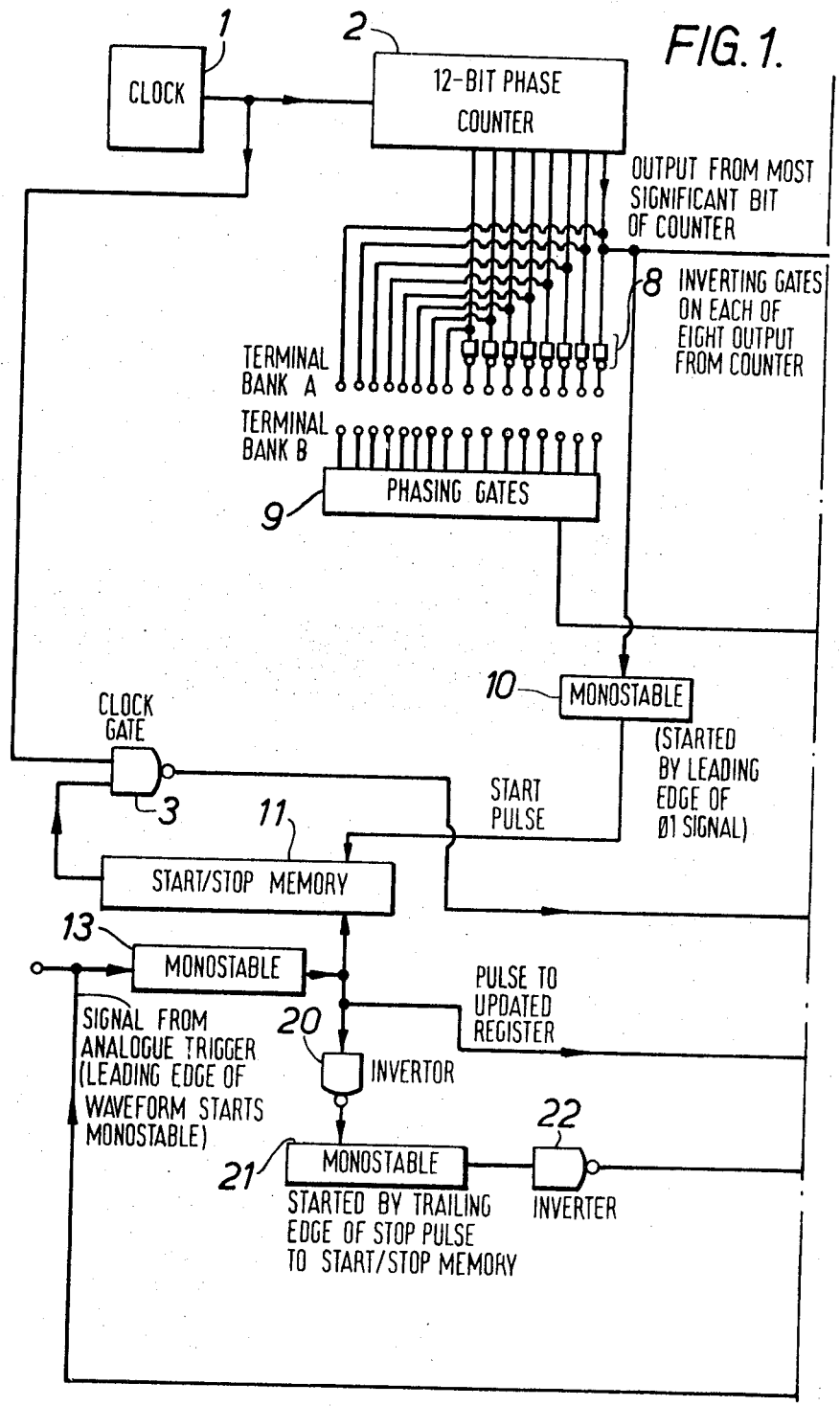

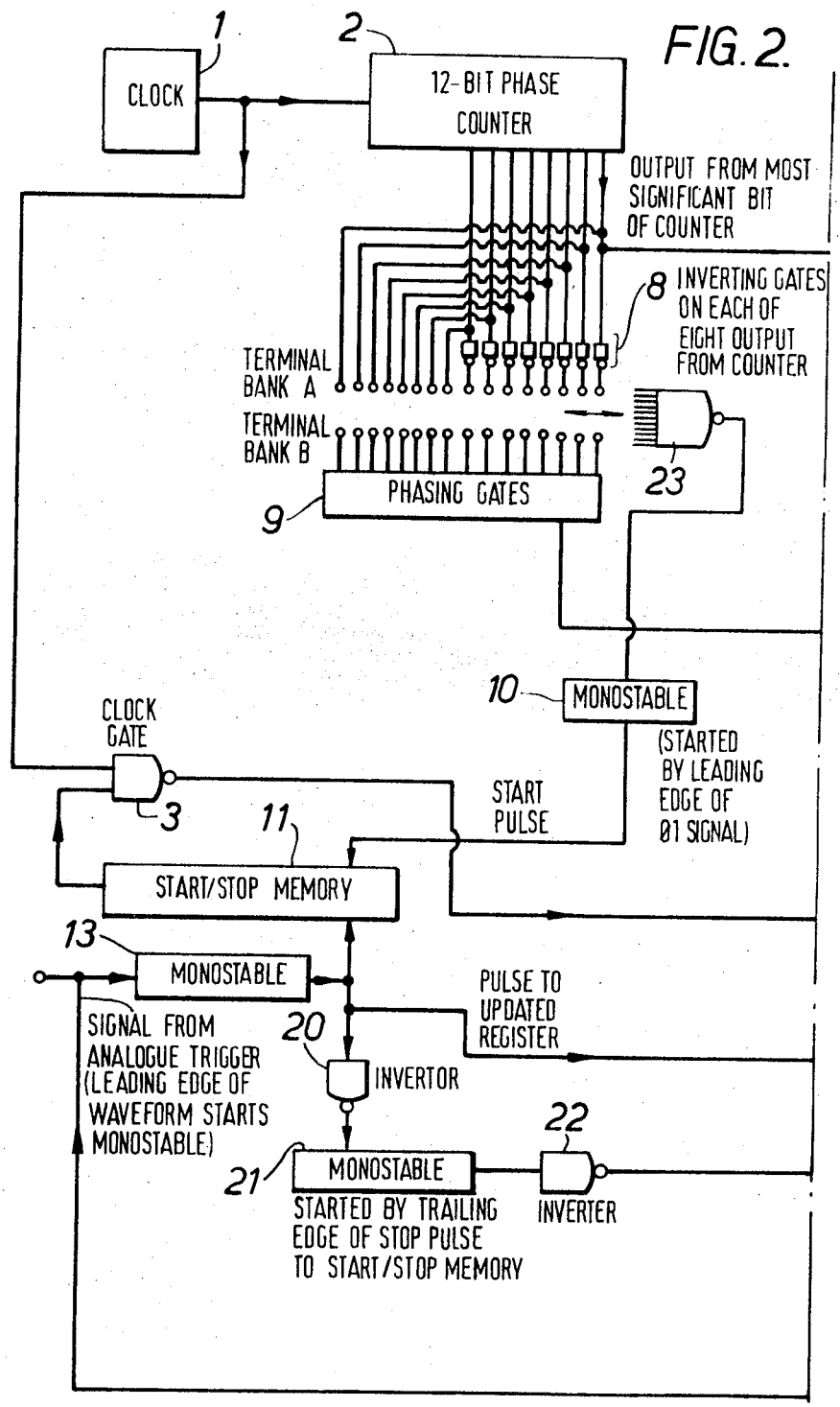

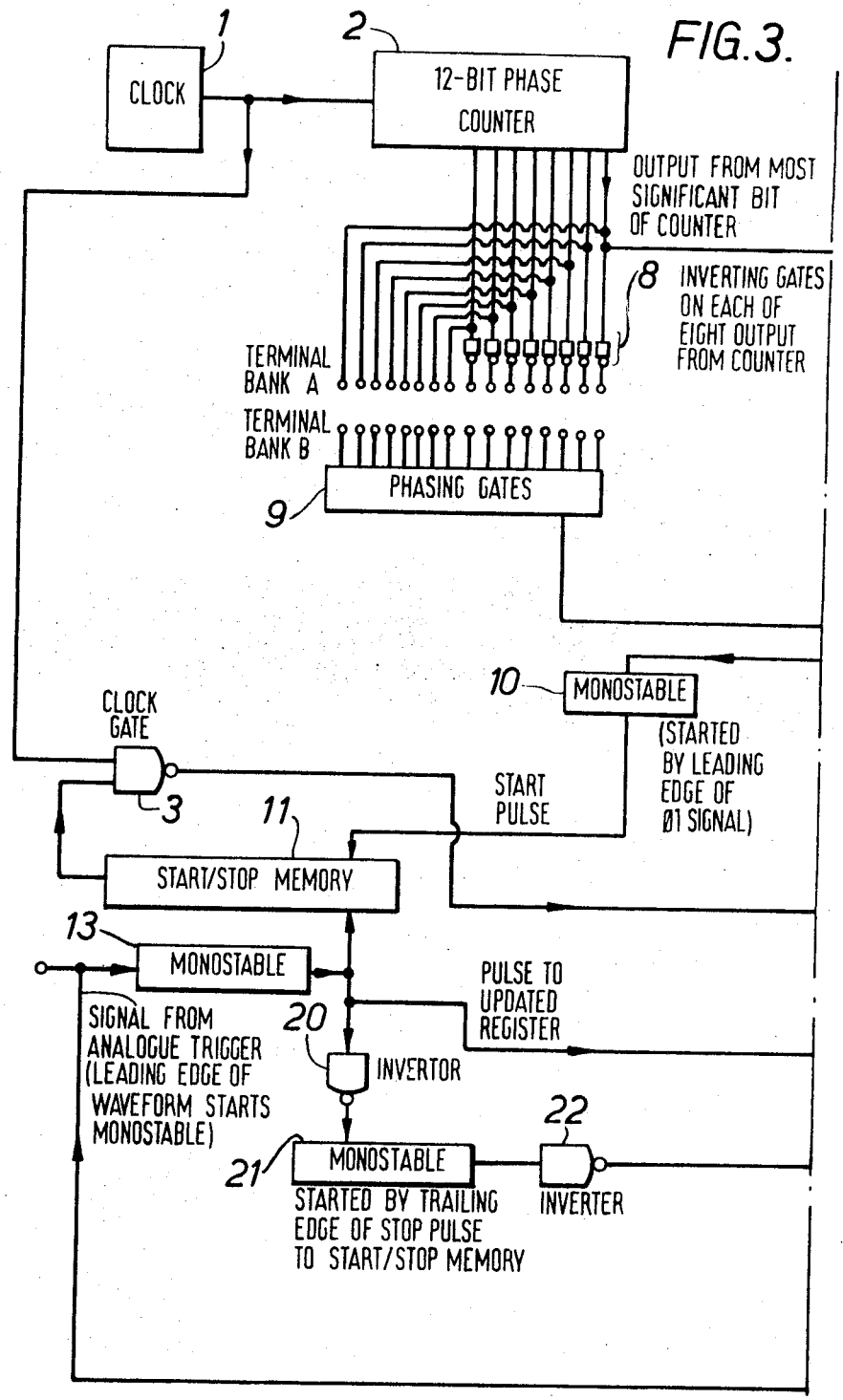

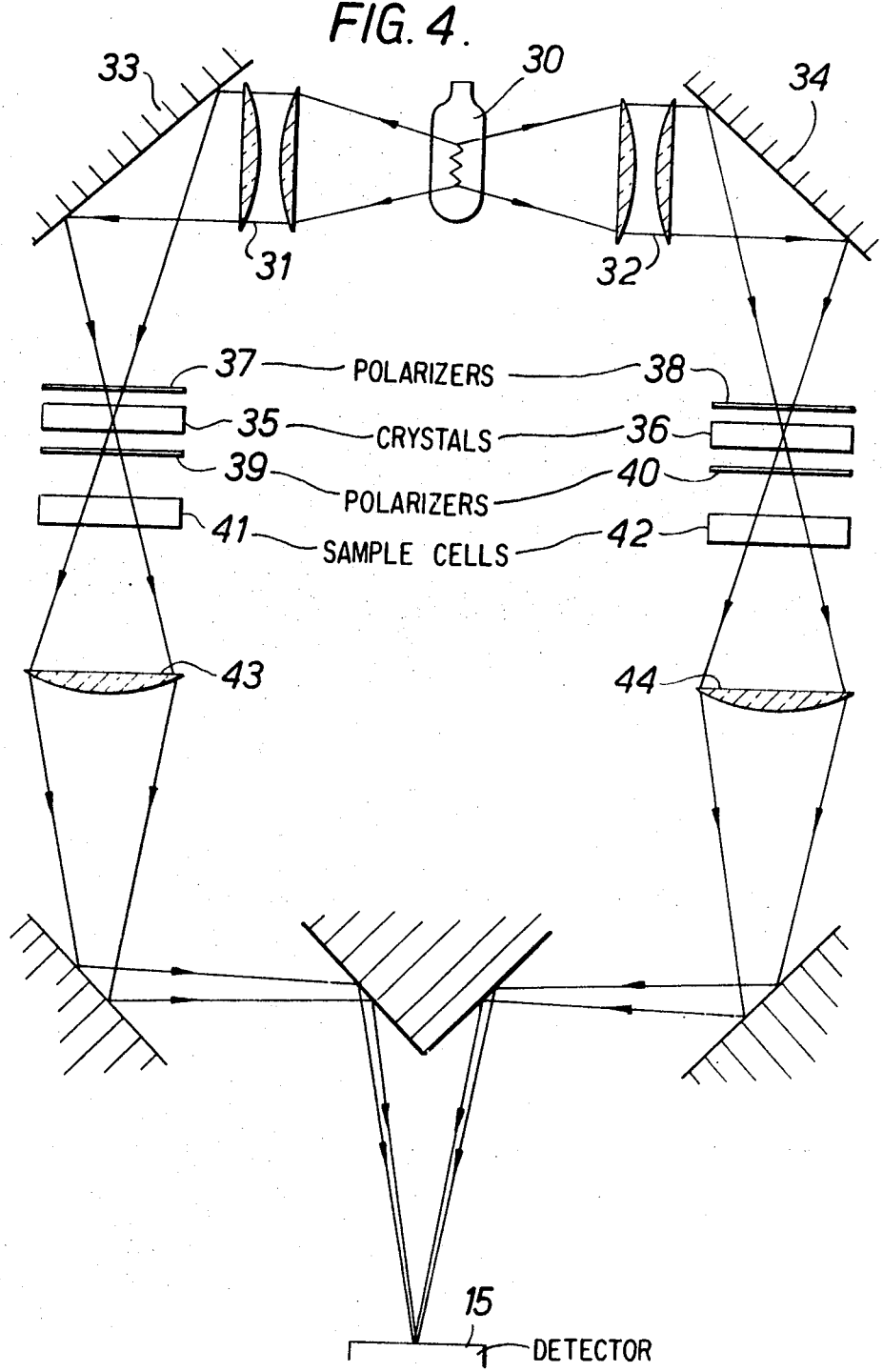

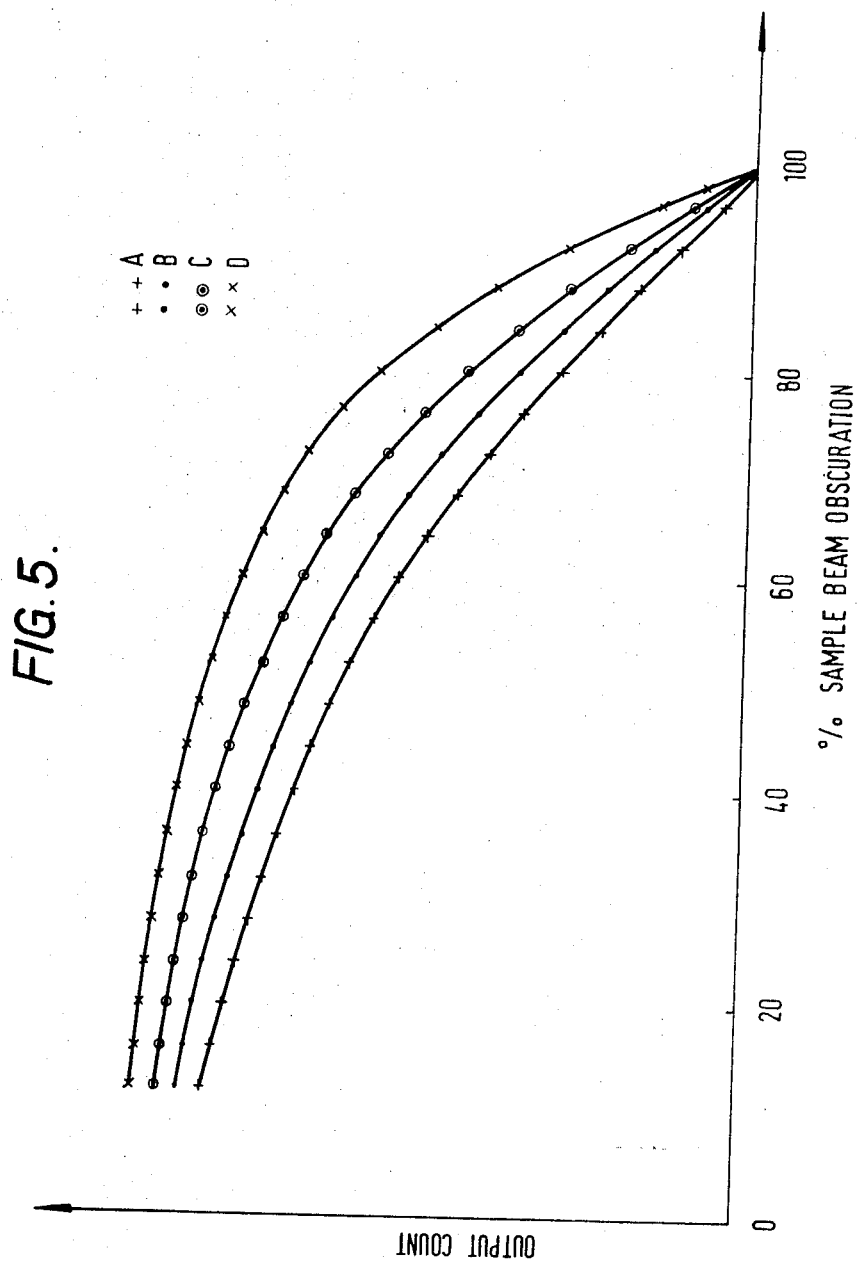

TWIN BEAM RADIATION ANALYSER USING RADIATION CHOPPERS

The present invention relates to a method for electromagnetic radiation analysis and apparatus for the same.

Radiation fluid analyzers of the type having a source of radiation split into two separate beams, at least one beam passing through a cell containing the fluid to be analyzed, means for sequentially chopping said beams, a detector system to which the beams are sequentially presented, and means for amplifying each of the signals and measuring the ratio of one to the other are known and have been described in British Pat. No. 899,973.

However, the previously described analyzers have the disadvantage that the means hitherto employed for sequentially chopping the beams of radiation have been of a mechanical nature, for example a rotating perforated disc, belt or cylinder. These mechanical devices have the disadvantage in that they are inherently unreliable and require maintenance.

We have found an alternative means for sequentially chopping beams of electromagnetic radiation in which these disadvantages are reduced or eliminated which comprises in each beam, means for polarising the beam of radiation, an electro- or magneto-optic crystal, said crystal when energized being capable of transmitting and rotating the plane of polarised radiation, a further polarizing agent located after the electro- or magneto-optic crystal and capable of being rotated in the chopped beam of radiation, and means to modulate the energizing current or voltage of each crystal.

The radiation fluid analyzers in which such beam choppers may be used include, for example, ultraviolet liquid and gas analyzers, visible spectrum liquid and gas analyzers and infrared liquid and gas analyzers.

By an electro- or magneto-optic crystal is meant a crystalline substance, capable of transmitting electromagnetic radiation, and which, when either subjected to a transverse electric field or an axial magnetic field rotates the plane of polarisation of electromagnetic radiation. The choice of crystal will depend on the wavelength used in the analyser. A suitable magneto-optic crystal for use with infrared radiation is an yttrium iron garnet crystal, hereinafter designated as YIG crystal. This is transparent to infrared radiation in a region of the infrared spectrum and rotates the plane of polarization of infrared radiation passing through it when a magnetic field is applied around the crystal along the axis of transmission.

The crystals are suitably placed between a pair of polarizing filters, constructed of a material that is appropriate to the wave length of the radiation employed. The second polarizing filter is rotated above the axis of transmission in such a way that the modulation of the electromagnetic radiation is maximized. The combination of polarizing filters and the crystals therefore acts as a chopper.

Each crystal is suitably energized by feeding either an alternating volage to the crystal in the case of an electro-optic system, or an alternating current to a coil around the crystal in the case of a magneto-optic system. The crystals are preferably activated by sequential square wave alternating currents or voltages to overcome the effects of non-linear rotation/field characteristics and variation of rotation of the plane of polarization with temperature changes.

It is found that the square wave form signal from the detector of a radiation fluid analyzer using an electro- or magneto-optic crystal chopper system activated by sequential square wave alternating currents or voltages is complex, and thus it is difficult and time consuming to obtain the desired analytical results. It has now been found that if the signal from the detector is filtered to obtain the fundamental sine wave form from the complex square wave there is a phase shift in the sine-wave of a magnitude related to the relative absorption of the two beams of radiation passing through the sample cells.

Accordingly the present invention is a method for analysis using a twin beam radiation analyzer which comprises modulating the two, incident beams of radiation by means of a radiation chopper comprising, in combination in each beam, polarizing means and an electro- or magneto-optic crystal, each crystal activated by one of two, out of phase, square wave form alternating currents or voltages to give two, out of phase, incident beams of radiation, passing at least one beam through a sample cell, presenting the resultant radiation to a detector, extracting the fundamental alternating wave form signal from the complex square wave form signal from the detector and measuring the phase shift of the fundamental alternating wave form signal.

The present invention is further a method for analysis using a twin beam radiation analyzer wherein the phase shift of the fundamental alternating wave form signal is automatically determined by triggering a counter with one of the two square wave form currents or voltages used to activate the radiation chopper or by a pulse bearing some fixed phase relationship with said currents or voltages and stopping the counter by means of the fundamental alternating wave form signal converted to a square wave form. In an alternative method using a counter, the latter can be started by a trigger signal derived from the complex square wave form signal from the detector.

It may be seen that any phase change in the fundamental alternating wave form signal will allow the counter to run for a longer period of time before cutoff occurs, and therefore the counter reading is related to the ratio of the absorption of radiation in the two sample cells.

The present invention is further apparatus for analysis which comprises in combination a square wave form alternating current or voltage generator supplying a square wave form alternating current or voltage to a counter divider arranged to divide said square wave form alternating current or voltage into two, out of phase, square wave form alternating currents or voltages, two amplifiers, each being arranged to amplify one of said out of phase currents or voltages, a twin beam radiation analyser, said radiation analyser having a radiation chopper comprising in combination in each beam, polarising means and an electro- or magneto-optic crystal, each crystal being arranged to be activated by one of said two, out of phase, square wave form alternating currents or voltages and means for detecting the complex resultant square wave form radiation means for amplifying the complex alternating signal from said detector a filter capable of extracting the fundamental alternating wave form signal from the complex signal from the detector, and a squaring amplifier to convert the extracted signal into a square wave form, wherein one of the two out of phase square wave form alternating currents or voltages from the counter divider is arranged to start a counter and the extracted signal in square wave form is arranged to stop said counter.

The invention will now be described with reference to a twin beam radiation fluid analyzer.

FIGS. 1, 1A are a diagrammatic representation of such an instrument in which details of the optical system are omitted.

FIGS. 2, 2A and 3, 3A show modifications of the instrument, again with the optical system omitted, and FIG. 4 is a layout of a suitable optical system for use when the instrument is a twin beam infrared liquid analyzer working in the overtone region of the infrared.

FIG. 5 is a plot of output count against percent obscuration.

Figure 1A:
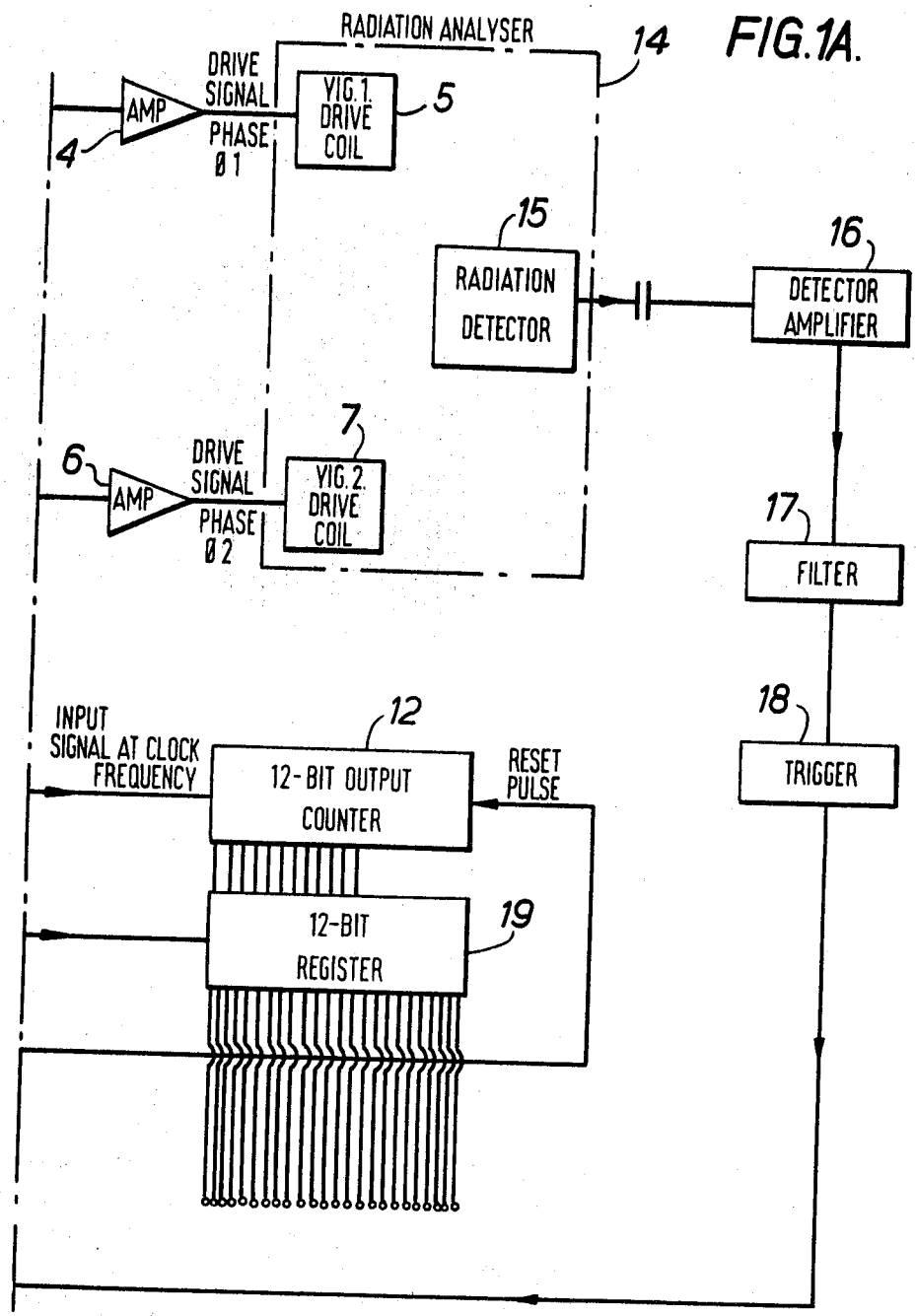

Referring to FIG. 1 a clock pulse generator 1 producing pulses at a repetition rate of about four million pulses per second supplies signals to the 12-bit phase counter 2 and to the clock gate 3. The phase counter divides the frequency of the clock pulses so that the most significant bit of the counter changes from the binary '0' state to the binary '1' state at the rate of $f$ where;

$$f = \frac{\text{clock pulse repetition rate}}{(2)^{12}} = \frac{\text{clock pulse repetition rate}}{4096}$$

Thus if the clock repetition rate is exactly 4.096 million pulses per second the most significant bit of the phase counter will produce a square wave voltage output at a frequency of exactly 1,000 hertz. Moreover, with the arrangement shown, the transition between the two binary states will be evenly spaced in time giving an output waveform which has a one to one mark-space ratio.

In practice the clock pulse repetition rate is adjusted so that the frequency is matched to the characteristics of the filter used in the analogue electronics thereby avoiding distortion of the analogue wave forms. The output from the most significant bit of the phase counter serves three purposes:

1. To drive via a single stage transistor amplifier 4 the exciting coil of one YIG crystal radiation modulator 5 by signal $\phi_1$.

2. To serve in conjunction with seven other less significant outputs from the counter. Each of these outputs is split into two, one of each going direct to terminal bank A, and the other going to an inverting gate which provides an output which is the logical inverse of the input signals to the gates (i.e. if the input is logical '1', the output is logical '0', but if the input is logical '0' the output is logical '1'). Thus the eight most significant output signals from the phase counter and the inverse of these are available at terminal bank A. These are fed by means of wire links arranged between terminal bank A and terminal bank B, which terminals are connected to the phasing gates 9 comprising two 8 input NAND gates and a memory circuit. The eight most significant bits and their inverse signals are fed to the inputs of the two NAND gates each of which produces a binary '0' output when, and only when, each of its eight inputs carried a binary '1' signal, otherwise the output is a binary '1'. Each NAND gate is therefore able to detect an unique assembly of binary signals present in the eight most significant bit outputs of the phase counter. By suitable linking of the outputs of the phase counter (terminal bank A) to the inputs of the eight input NAND gates (terminal bank B) it is possible to obtain, at the outputs of the two NAND gates, evenly spaced transitions between the binary signal levels at the same frequency as the transitions of signal $\phi_1$ but displaced in phase from them. These transitions are used to set and reset repeatedly a memory circuit. The output, $\phi_2$, from the memory circuit is amplified by a single stage transistor amplifier 6 and used to drive the exciting coil of the second YIG crystal radiation modulator. The phase difference between the signals $\phi_1$ and $\phi_2$ can be varied by varying the linkages between the output of the phase counter 2 and the eight input NAND gates (the phasing gates 9). This selection of phase difference can be performed in steps which are any integral multiple from one to two hundred and fifty six of 42.2 minutes of arc $$\left( = \frac{180°}{(2)^8} \right).$$

By varying the phase difference the sensitivity (output counts per unit change in sample beam obscuration) and linearity of the measurement are varied. In FIG. 5, which is a plot of output count against percentage obscuration, the curves A, B, C and D are for phase differences ($\phi_1 - \phi_2$) of 160°, 165°, 170° and 175° respectively. From these plots it can be seen that it is possible to improve the linearity of the instrument at the expense of sensitivity.

3. To initiate the production of a brief (10 $\mu$ sec) pulse from a monostable circuit, 10. This pulse is used to set a memory circuit, 11, which then "opens" the clock gate 3 permitting the clock pulses to reach the 12-bit output counter 12 which begins to count these pulses. The pulse may alternatively be initiated by the NAND gate 23 (FIG. 2), or by the pulse and delay circuits 24 and 25 (FIG. 3).

Counting of clock pulses by the output counter 12 continues until the start/stop memory 11 is reset by the arrival of a pulse from the monostable 13, this pulse being initiated by the leading edge of the signal from the analogue trigger circuit. The analogue trigger circuit consists of four components; the radiation detector of the radiation analyser 14, a detector amplifier 16, a filter unit 17 which is suitably a CR filter with a chebechev characteristic which extracts the fundamental sine wave from the complex waveform produced at the detector, and a trigger unit 18. This whole analogue trigger circuit provides a pulse with a fast rise time, related to the fundamental sine wave. The count or number held by the output counter at this time corresponds to the phase shift which it is desired to measure, plus a fixed phase delay caused by the filter network of the analogue circuits.

In addition to resetting the start/stop memory 11, the output from the monostable 13 is fed to the clock line of the 12-bit register 19 which is thereby enabled to follow the outputs of the 12-bit counter 12 (i.e. the number held in the output counter 12 is transferred to the register 19).

The trailing edge of the pulse from the monostable 13 is used to initiate a pulse from monostable 21 by means of inverter 20, and this latter pulse is fed through inverter 22 to the 12-bit output counter 12 in order to reset it to 0.

At this stage one complete measuring cycle has been completed and the circuits enter a quiescent period with a number held in the 12-bit register 19. The cycle is repeated from the beginning when the next leading edge in the $\phi_1$ wave form occurs. The number held in the register 19 is therefore updated approximately 1,000 times a second. 24 outputs are available from the register 19 corresponding to the output signals from the output counter 12 and the inverse of these signals. These outputs from the register can be used to drive a digital-to-analogue conversion circuit and/or a digital display (not shown). By making use of the inverse outputs from the register it is possible to compensate for the zero error caused by the fixed phase delay that is introduced by the analogue filter network.

Figure 2A:
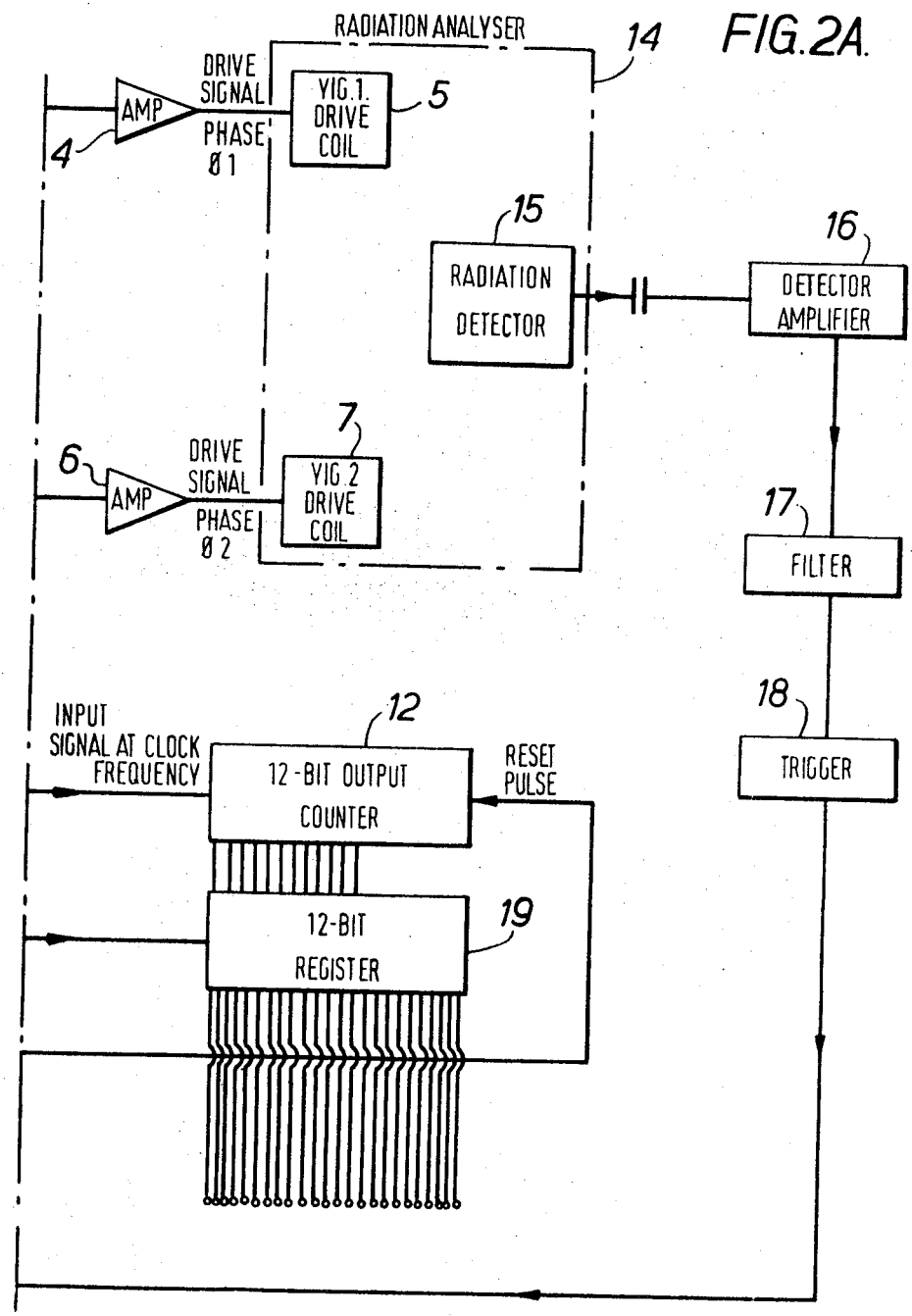
Figure 3A:
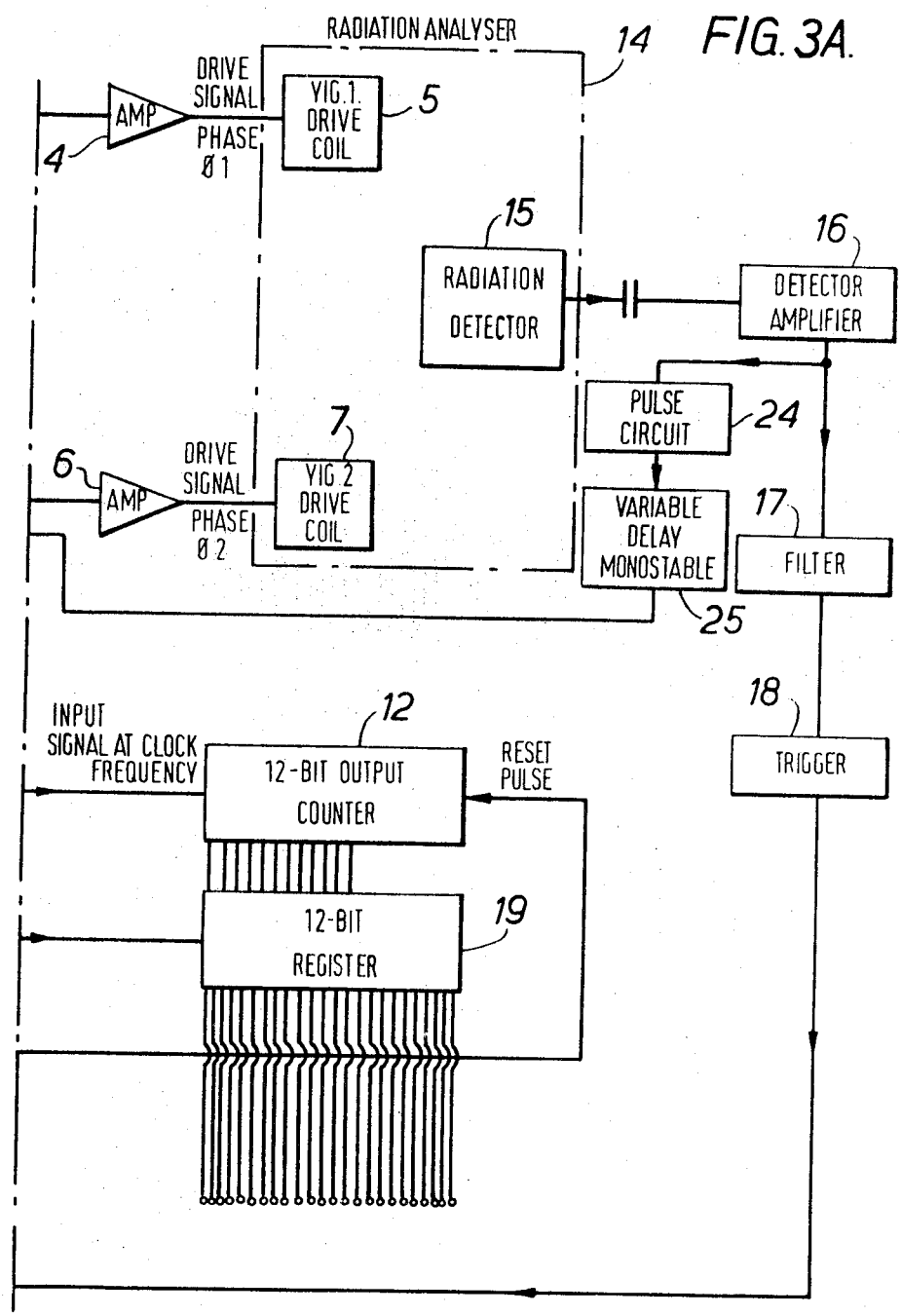

Alternative methods of compensating for the zero error caused by the fixed phase delay are shown in FIGS. 2 and 3. In FIG. 2, instead of relying on the inverse outputs from the 12-bit register 19 to provide compensation for the zero error, the start pulse relative to the YIG crystal modulator drive signal $\phi_1$ is delayed. This is suitably achieved by using an eight-input NAND gate 23 to drive the monostable 10. The phase relative to $\phi_1$, of the output signal from monostable 10 can then be set to the required value by selecting as inputs to the NAND gate 23, the appropriate signals present at eight of the 16 terminals in terminal bank A.

In FIG. 3 a further method of achieving the required zero correction and at the same time reducing the "noise" in the system is shown. This is suitably achieved by using the complex wave form from the detector amplifier 16 to produce a pulse signal with a short rise time. This signal generated in the pulse circuit 24, is delayed by a variable delay monostable circuit 25, which has an adjustable pulse width, and the delayed pulse is used to start monostable 10. By using the complex wave form to start, the output counter indirectly, the effects of cariations in response time of the radiation detector 15 are rendered insignificant.

In FIG. 4 a suitable optical layout for the analyzers of FIGS. 1 to 3 is shown in which radiation from a suitably shielded tungsten lamp 30 is passed through collimaters 31 and 32, so arranged that when the beams are reflected at surfaces 33 and 34 they are focused on the YIG crystals 35 and 36. After reflection at the surfaces 33 and 34, the beams pass through polarising filters 37 and 38 so that the incident infrared radiation at the YIG crystals is substantially plane polarized. The second pair of polarizing filters 39 and 40 are so oriented that the modulation of the infrared radiation is maximized. When the YIG crystals are sequentially energized by means of square wave alternating currents passed through coils around the crystals, the intensity of the transmitted infrared radiation is varied in a sequence governed by the phase difference between the two energizing currents. The chopped beams are passed through the sample cells 41 and 42 and then through lenses 43 and 44, arranged to focus the beams on the detector 15. The detector may be any of the known detector devices for infrared radiation, for example, a lead sulphide detector or an indium antimonide detector. The actual detector and the type of optical windows used will depend on the wave length of the radiation being studied.

By using electro- or magneto-optic crystals modulated by the square wave form alternating currents or voltages in the radiation chopper, it is possible to make a completely solid state radiation analyzer which gives a ratio measurement, the sensitivity of which can readily be changed by changing the phase difference between the square wave form alternating currents or voltages used to activate the chopper.

We claim:

1. In a method for analysis using a twin beam radiation analyzer in which two beams of radiation are chopped by electrically modulated optical crystal means, are passed through polarizing means and are detected by a detector which provides an electrical signal output corresponding to said beams, one of said beams also being passed through a sample cell containing a sample to be analyzed, the steps comprising separately chopping each of said beams out of phase by a pair of said crystal means, one in each beam, with out of phase, square wave form, alternating electrical signals, a signal of one phase being applied to one of said crystal means and the signal of a different phase being applied to the other of said crystal means to give two corresponding beams of radiation which are chopped out of phase and one of which is passed through said sample cell, directing said beams on said detector, said one beam being directed thereon after passing through said sample cell, to provide a complex electrical signal at the output of said detector which has a square wave form but a fundamental alternating wave form which varies continuously in phase with the relative absorption of said two beams prior to being directed on said detector, extracting said fundamental alternating wave form signal from said complex signal, and measuring the phase shift of said fundamental wave form signal produced by said relative absorption.

2. A method as set forth in claim 1, wherein said phase shift is measured by starting a counter at a time having a predetermined relation to one of said alternating electrical signals used to modulate the crystal means, converting said fundamental alternating wave form signal to a square wave form signal and stopping said counter by said last-mentioned signal to provide a count dependent upon said phase shift.

3. A method as set forth in claim 1, wherein said phase shift is measured by deriving a trigger signal from the output signals of said detector, starting a counter with said trigger signal, converting said fundamental alternating wave form signal to a square wave form signal and stopping said counter by said last-mentioned signal to provide a count dependent upon said phase shift.

4. Apparatus for radiation analysis comprising means for generating a pair of radiation beams; detector means for receiving and detecting said beams; optical crystal chopping means with electrical means for modulating said crystal means and radiation polarizing means mounted in each of said beams between said generating means and said detector means; a sample cell mounted in one of said beams between said generating means and said detector means; means for supplying two sets of square wave form alternating signals to said modulating means, one set being supplied to one of said modulating means and the other set being out of phase with the first set and being supplied to the other of said modulating means, comprising counter divider means and means connecting said divider to said modulating means; said detector means having an output when receiving said beams providing a complex output signal thereat which has a square wave form but a fundamental alternating wave form signal which varies continuously in phase with the relative absorption of said two beams prior to reception thereof by said detector means and extracting means connected to said output for extracting said fundamental wave form signal; squaring means connected to said extracting means for converting said fundamental wave form signal into a corresponding square wave signal; a counter; means connecting said counter to one of said counter divider means and said detector means for supplying a start signal thereto; and means connecting said counter to said squaring means for supplying a stop signal thereto whereby the count of said counter indicates the phase shift corresponding to said relative absorption of said beams.

5. Apparatus as set forth in claim 4, wherein said means connecting said counter to one of said counter divider means and said detector means comprises means connecting said counter to the portion of said counter divider supplying one of said sets of square wave form alternating signals.

6. Apparatus as set forth in claim 5, wherein said means for supplying two sets of square wave form alternating signals comprises means for adjusting the phase difference therebetween.

7. Apparatus as set forth in claim 4, wherein said means connecting said counter to one of said counter divider means and said detector means comprises means controlled by said counter divider for generating pulses having a predetermined phase relationship to one of said sets of square wave form alternating signals.

8. Apparatus as set forth in claim 7, wherein said means for supplying two sets of square wave form alternating signals comprises means for adjusting the phase difference therebetween.

9. Apparatus as set forth in claim 4, wherein said means connecting said counter to one of said counter divider means and said detector means comprises means connected to said detector means and controlled by said complex output signal for generating a trigger signal for starting said counter.

10. Apparatus as set forth in claim 9, wherein said means for supplying two sets of square wave form alternating signals comprises means for adjusting the phase difference therebetween.

* * * * *